US012043023B2

(12) United States Patent
Egelmeers et al.

(10) Patent No.: US 12,043,023 B2
(45) Date of Patent: Jul. 23, 2024

(54) SHEET CONVEYOR FOR A PRINTER COMPRISING PRESSING MEANS FOR FLATTENING A SHEET

(71) Applicant: Canon Production Printing Holding B.V., Venlo (NL)

(72) Inventors: Thijs R. N. Egelmeers, Venlo (NL); Johannes H. L. Smeyers, Venlo (NL)

(73) Assignee: CANON PRODUCTION PRINTING HOLDING B. V., Venlo (NL)

( * ) Notice: Subject to any disclaimer, the term of this patent is extended or adjusted under 35 U.S.C. 154(b) by 187 days.

(21) Appl. No.: 17/739,504

(22) Filed: May 9, 2022

(65) Prior Publication Data

US 2022/0371337 A1 Nov. 24, 2022

(30) Foreign Application Priority Data

May 21, 2021 (EP) .................................... 21175373

(51) Int. Cl.
*B41J 11/00* (2006.01)

(52) U.S. Cl.
CPC .................................. *B41J 11/007* (2013.01)

(58) Field of Classification Search
CPC ........ B41J 11/007; B41J 13/025; B41J 13/08; B41J 11/0005; B41J 11/00222; B41J 15/04; B41J 11/0085; B41J 13/0009; B41J 13/076; B65H 2301/51232; B65H 2301/51256; B65H 2404/54; B65H 5/025
See application file for complete search history.

(56) References Cited

U.S. PATENT DOCUMENTS

| | | | |
|---|---|---|---|
| 5,938,356 | A | 8/1999 | Wirth et al. |
| 8,308,156 | B2 | 11/2012 | Shinohara |
| 2009/0167833 | A1 | 7/2009 | Mochizuki |
| 2017/0087899 | A1 | 3/2017 | Aoki et al. |

FOREIGN PATENT DOCUMENTS

| | | |
|---|---|---|
| JP | 2017-39251 A | 2/2017 |

OTHER PUBLICATIONS

European Search Report issued in Application No. 21 17 5373, dated Nov. 5, 2021.

*Primary Examiner* — Jannelle M Lebron
(74) *Attorney, Agent, or Firm* — Birch, Stewart, Kolasch & Birch, LLP

(57) ABSTRACT

The present invention seeks to flatten a sheet when transferred onto an endless belt conveyor facing a print head assembly in a simple and/or low costs manner. Thereto a sheet conveyor is provided comprising an endless, air permeable belt and pressing means. The pressing means comprise a plurality of pressing members spaced apart from one another in a lateral direction of the belt, each pressing member comprising a body which body is moveable in a perpendicular direction with respect to the belt as well rotatable or pivotable around an axis in the perpendicular direction independent of the corresponding bodies of other pressing members. This provides a simple and passive sheet flattening means, resulting in low operational and material costs.

14 Claims, 3 Drawing Sheets

SHEET CONVEYOR FOR A PRINTER COMPRISING PRESSING MEANS FOR FLATTENING A SHEET

BACKGROUND OF THE INVENTION

1. Field of the Invention

The invention relates to a sheet conveyor for a printer and a printer comprising such a sheet conveyor, as well as to a method for transporting sheet on such a conveyor.

2. Description of Background Art

A sheet conveyor in a printer may comprise an endless belt conveyor to support the sheet as it passes by a print head assembly. The endless belt conveyor provides a flat yet continuously moving print surface, which allows for productive printing. It is desired that the sheet is transferred onto the endless belt conveyor in a flat state, i.e. with minimized winkling or no wrinkling of the sheet. It is known to provide air knives which apply jets of pressurized air to press the sheet down in order to flatten the sheet onto the belt.

SUMMARY OF THE INVENTION

It is an object of the invention to provide an alternative sheet conveyor for a printer, preferably one which allows for flattening the sheets in a low costs manner.

In accordance with the present invention, a sheet printer according to claim 1, a first sheet conveyor according to claim 15, and a method according to claim 16 are provided. Said sheet printer comprises a first sheet conveyor, comprising an endless, air permeable belt defining a sheet support surface positioned downstream of a second sheet conveyor and pressing means for pressing a sheet transferred from the second sheet conveyor onto the sheet support surface of the first sheet conveyor, wherein the pressing means comprise a plurality of pressing members spaced apart from one another in a lateral direction of the belt, each pressing member comprising a first body, which first body is formed as a wheel with a central opening and is moveable in a perpendicular direction with respect to the belt as well rotatable or pivotable around an axis in the perpendicular direction independent of the first bodies of other pressing members, wherein each pressing member comprises a second body formed as a portion of a support rod extending in the lateral direction through the central opening, and wherein a cross-section of the central opening exceeds a cross-section of the support rod, such that the wheel is moveable with respect to the support rod in the perpendicular direction as well as rotatable or pivotable over a predetermined range around an axis in the perpendicular direction. The pressing means divides its pressing members over the width of the belt, and thus of the sheet. The sheet can thereby be engaged by the pressing means at multiple points across its full width. Each first body is moveable with respect to the belt independent of the other first bodies. This allows each first body to move with respect to the belt in the perpendicular direction, which direction is parallel to the direction of gravity during use. In consequence, the moveable, first body presses on the sheet during use under the influence of gravity, thereby locally flattening the sheet. The first body is a wheel with a central opening having a cross-section or diameter larger than that of the support rod extending through it. The wheel is mounted with a significant amount of play on the support rod, which allows the wheel to rotate around the support rod, as well as pivot or rotate around an axis in the perpendicular direction within a limited range determined by the amount of play between the wheel and the support rod. The distance between the top portion of the support rod and the sheet support surface is less than the distance between the top portion of the opening in the wheel and the sheet support surface to allow the weight of the wheel to press onto the sheet. Since multiple of such moveable, first bodies press on several different lateral positions of the sheet, any wrinkle contacting these first bodies is locally flattened, which divides said wrinkle into smaller wrinkles or even removes the wrinkle. In consequence, the maximum height of the sheet, including any remaining wrinkles therein, is less than that of the original wrinkle. The first body is further rotatable or pivotable around an axis in the perpendicular direction, which allows each first body to align itself to any in-plane forces originating from the sheet independent of the other pressing members. This prevents the sheet from damage or deformation during pressing. Thus the sheet is effectively flattened without any active components, such as pressurized air. This results in low operational costs. The pressing means may further be formed by a low number of relatively cheap components. Thereby the object of the present invention has been achieved.

More specific optional features of the invention are indicated in the dependent claims.

In an embodiment, each first body is further rotatable around an axis parallel to the lateral direction. The first bodies are rotatable preferably independent of one another around an axis parallel to the plane of the sheet support surface. The rotation allows the first bodies to roll over the sheet, such that friction between the first bodies and the sheet is minimal while maintaining a sufficient pressing force.

In an embodiment, the second body has a cross-section at the opening smaller than that of the opening, such that the opening limits movement of the first and second bodies with respect to one another in or more directions parallel to the support surface and allows the first bodies to press onto the sheet under the influence of gravity, when the perpendicular direction is parallel to the direction of gravity. The first body and the second body are moveable with respect to one another, since the openings of the first bodies are larger than the portions of the second body extending through the opening during use. This allows the first bodies to move with respect to the belt in at least the perpendicular direction, which direction is parallel to the direction of gravity during use. In consequence, the moveable, first bodies press on the sheet under the influence of gravity during use, thereby locally flattening the sheet. The opening provides sufficient play to create at least two degrees of freedom, which allows the first bodies to move in the perpendicular direction as well as pivot or rotate around an axis in the perpendicular direction with respect to one another. The range of rotation or pivoting may be limited dependent on the amount of play between the first and second bodies. This results in low costs and durable pressing means.

In an embodiment, the opening limits the relative movement of the first and second bodies to maintain the first bodies at a similar lateral and/or longitudinal position, while allowing said first bodies to move with respect to one another in the perpendicular direction for pressing onto the sheet under the influence of gravity as well as to rotate and/or pivot with respect to one another around an axis in the perpendicular direction as a result of a force originating from the sheet and being parallel to the sheet support plane. The opening restricts movement of the moveable one of the first bodies in the transport direction and/or the lateral direction of the belt. The position of the moveable first body is on average constant at a predetermined position, though the first body may be displaced from the average or rest position within a small, limited range. The opening of the first body being larger than the cross-section of the second body provides degrees of freedom which allow the first bodies to move with respect to one another in the perpendicular direction as well as rotate or pivot. This allows for a relatively simple and low costs construction. It will be appreciated that movement of the first bodies may further be limited by limiting means on the second body, such as dividers or separation walls, which prevent the first bodies from moving out of a predetermined range in the lateral direction.

In an embodiment, each first body is movable with respect to the sheet support surface and the second body is stationary with respect to the sheet support surface. The stationary, second body is preferably connected to a frame of the conveyor or printer.

The stationary, second body is positioned to define the range of motion of the moveable, first body, such that the moveable, first body is able to move in the perpendicular direction into contact with the sheet or belt and away from it. The range of perpendicular motion extends above the belt during use, at least for the portion of moveable, first body which contacts the sheet or belt. The stationary, second body further defines the axis around which the moveable, first body is able to rotate or pivot. This is preferably achieved by mounting the moveable, first body with sufficient play at or around the stationary, second body. The play allows the moveable, first body to rotate or pivot, at least within a predetermined range. The play is easily achieved by forming the central opening larger than the portion of the second body extending through it.

In an embodiment, the moveable, first body is moveable movable towards the stationary, second body in the perpendicular direction into an end position wherein a circumference of the opening prevents further movement of the moveable, first body in said direction, and wherein during use the belt is positioned near the stationary, second body, such that the moveable, first body is prevented from reaching the end position. In the end position, an outer circumference of the second body would be in contact with a circumference of the central opening of the first bodies at the highest point of the second body. This limits the movement of the bodies with respect to one another, at least such that the moveable, first body cannot move further in the direction of gravity during use. The contact may further reduce the rotational or pivotable movement of the moveable, first body, for example by fittingly receiving the moveable, first body in the opening. The end position is positioned to lie below the sheet support surface during use, such that the moveable, first body is prevented from reaching the end position by contact with the sheet or belt. This ensures that during use the moveable, first body maintains its moveability, specifically its rotation around the perpendicular direction.

In an embodiment, the moveable, first body is rotatable around a rotation axis in the lateral direction. The rotation is preferably achieved by mounting the moveable, first body with play on the stationary, second body. The stationary, second body defines the axis around which the moveable, first body rotates. Due to the play between the first and second bodies, the moveable, first body may rotate in an irregular manner, as if the rotational axis shifts within a limited range.

In an embodiment, the moveable, first body comprises a circular circumference when viewed in the lateral direction. The moveable, first body is formed as a wheel, for example as a sphere, cylinder, roller, etc. The opening preferably comprises a corresponding circular circumference with a diameter smaller than that of the outer circumference of the moveable, first body. The round shapes allow for a low friction, rolling contact between the moveable, first body and the sheet, as well as an easy to manufacture device. The diameter of the second body is smaller than that of the central opening at each corresponding first body. The first bodies are suspended with play on the second body. Preferably, the distance between the second body and the belt is less than the diameter of a first body minus its thickness (the thickness being its side wall height or profile). The positions the end position below the belt's top surface.

In an embodiment, a weight of the moveable, first body is sufficiently large to maintain a portion of the sheet below the moveable, first body in contact with the belt. The moveable, first body is preferably in pressing contact with the sheet during its full passage along the pressing means. The moveable, first body is preferably sufficiently heavy to prevent it from bouncing of the sheet when contacting the leading edge of the sheet and/or any wrinkles therein. Preferably, the weight of the moveable, first body has been selected below a certain threshold, above which threshold the pressing would result in deformations in the sheet leading to visible artifacts in the printed sheet. This results in a reliable flattening of the sheet.

In an embodiment, a circumference of the central opening during use surrounds the second body on at least two sides of the moveable, first body. The opening is sufficiently large that the moveable, first body is moveable within a limited range in the transport direction around a predetermined point fixed by the stationary, second body. The stationary, second body's position determines a rest or average position of the moveable, first body. Due to the play between the first and second bodies, the moveable, first body has a limited range of movement around this rest or average position. The play further allows the moveable, first body to rotate or pivot. A similar restriction may be provided by the opening in the lateral direction, though within the present invention separate spacers may further be applied to maintain the pressing members at a certain lateral position.

In an embodiment, at least five, preferably at least eight pressing members, and very preferably at least ten pressing members are spaced apart from one another in a lateral direction of the belt. Dependent on the sheet size and material a sufficient number of pressing members should be provided to flatten the wrinkles.

In an embodiment, the first sheet conveyor further comprises a drive for rotating the support rod. The support rod is driven, preferably at a rate or frequency corresponding to the velocity of the belt. The rotation of the support rod matches the velocity of the belt to reduce any pulling or pushing of the pressing members on the sheet during contact.

The sheet printer is preferably an inkjet printer for mid to volume printing, comprising a transport path capable of simultaneously holding a relatively large number of sheets, for example at least 10, very preferably at least 20.

The present invention further relates to a first sheet conveyor comprising an endless, air permeable belt defining a sheet support surface positioned downstream of a second sheet conveyor and pressing means for pressing a sheet transferred from the second sheet conveyor onto the sheet support surface of the first sheet conveyor, wherein the pressing means comprise a plurality of pressing members spaced apart from one another in a lateral direction of the belt, each pressing member comprising a first body, which first body is formed as a wheel with a central opening and is moveable in a perpendicular direction with respect to the belt as well rotatable or pivotable around an axis in the perpendicular direction independent of the bodies of other pressing members, wherein each pressing member comprises a second body formed as a portion of a support rod extending in the lateral direction through said opening, and wherein a cross-section of the opening exceeds a cross-section of the support rod, such that the wheel is moveable with respect to the support rod in the perpendicular direction as well as rotatable or pivotable over a predetermined range around an axis in the perpendicular direction.

The present invention further relates to a method of transporting sheets comprising the steps of:

transferring a sheet onto a first sheet conveyor comprising an endless, air permeable belt defining a sheet support surface positioned from a second sheet conveyor;

pressing the transferred sheet by means of pressing means for pressing a sheet onto the sheet support surface of the first sheet conveyor, wherein the pressing means comprise a plurality of pressing members spaced apart from one another in a lateral direction of the belt, each pressing member comprising a first body, which first body is formed as a wheel with a central opening and is moveable in a perpendicular direction with respect to the belt as well rotatable or pivotable around an axis in the perpendicular direction independent of the bodies of other pressing members, wherein each pressing member comprises a second body formed as a portion of a support rod extending in the lateral direction through said opening, and wherein a cross-section of the opening exceeds a cross-section of the support rod, such that the wheel is moveable with respect to the support rod in the perpendicular direction as well as rotatable or pivotable over a predetermined range around an axis in the perpendicular direction.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE PREFERRED EMBODIMENTS

Figure 1:
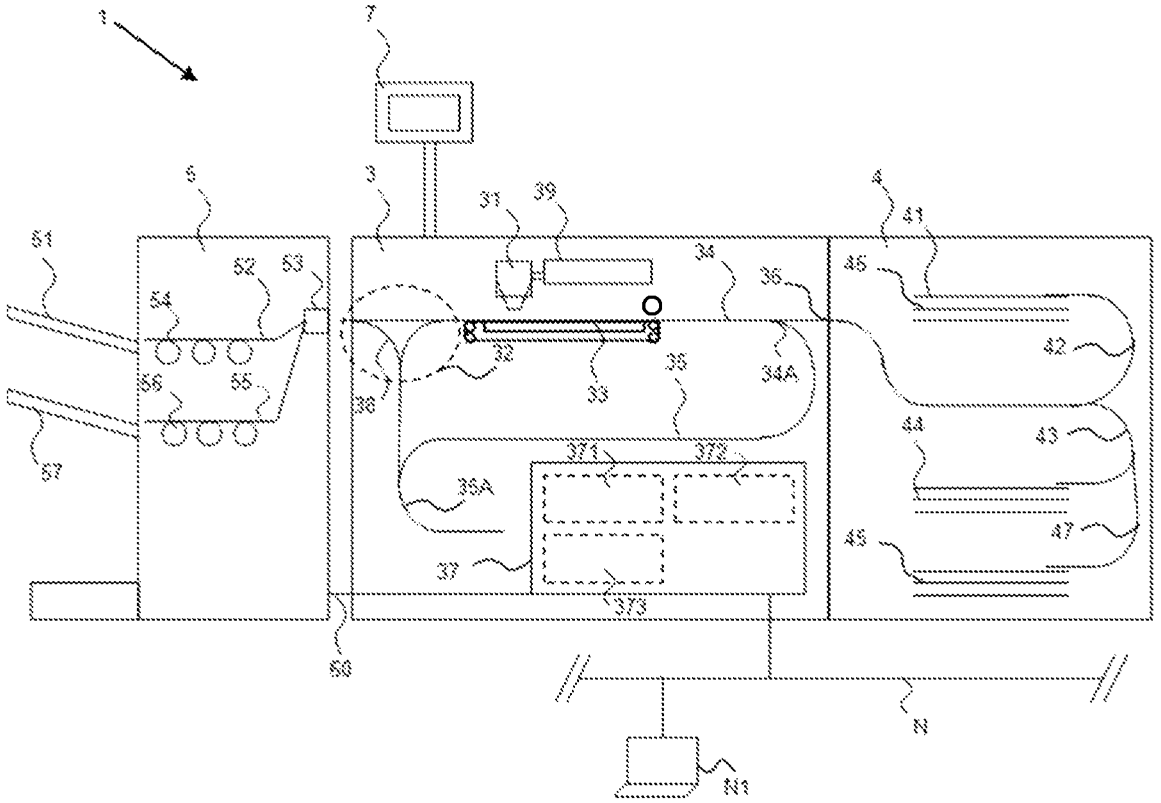
FIG. 1 is a schematic cross-sectional side view of a sheet printer comprising a sheet conveyor according to the present invention.

The present invention will now be described with reference to the accompanying drawings, wherein the same reference numerals have been used to identify the same or similar elements throughout the several views.

FIG. 1 shows schematically an embodiment of a printer 1 according to the present invention. The printer 1, for purposes of explanation, is divided into an output section 5, a print engine and control section 3, a local user interface 7 and an input section 4. While a specific printer is shown and described, the disclosed embodiments may be used with other types of printer such as an ink jet print system, an electrographic print system, etc.

The output section 5 comprises a first output holder 52 for holding printed image receiving material, for example a plurality of sheets. The output section 5 may comprise a second output holder 55. While 2 output holders are illustrated in FIG. 1, the number of output holders may include one, two, three or more output holders. The printed image receiving material is transported from the print engine and control section 3 via an inlet 53 to the output section 5. When a stack ejection command is invoked by the controller 37 for the first output holder 52, first guiding means 54 are activated in order to eject the plurality of sheets in the first output holder 52 outwards to a first external output holder 51. When a stack ejection command is invoked by the controller 37 for the second output holder 55, second guiding means 56 are activated in order to eject the plurality of sheets in the second output holder 55 outwards to a second external output holder 57.

The output section 5 is digitally connected by means of a cable 60 to the print engine and control section 3 for bi-directional data signal transfer.

The print engine and control section 3 comprises a print engine and a controller 37 for controlling the printing process and scheduling the plurality of sheets in a printing order before they are separated from input holder 44, 45, 46.

The controller 37 is a computer, a server or a workstation, connected to the print engine and connected to the digital environment of the printer, for example a network N for transmitting a submitted print job to the printer 1. In FIG. 1 the controller 37 is positioned inside the print engine and control section 3, but the controller 37 may also be at least partially positioned outside the print engine and control section 3 in connection with the network N in a workstation N1.

The controller 37 comprises a print job receiving section 371 permitting a user to submit a print job to the printer 1, the print job comprising image data to be printed and a plurality of print job settings. The controller 37 comprises a print job queue section 372 comprising a print job queue for print jobs submitted to the printer 1 and scheduled to be printed. The controller 37 comprises a sheet scheduling section 373 for determining for each of the plurality of sheets of the print jobs in the print job queue an entrance time in the paper path of the print engine and control section 3, especially an entrance time for the first pass and an entrance time for the second pass in the loop in the paper path according to the present invention. The sheet scheduling section 373 will also be called scheduler 373 hereinafter.

The sheet scheduling section 373 takes the length of the loop into account. The length of the loop corresponds to a loop time duration of a sheet going through the loop dependent on the velocity of the sheets in the loop. The loop time duration may vary per kind of sheet, i.e. a sheet with different media properties.

Resources may be recording material located in the input section 4, marking material located in a reservoir 39 near or in the print head or print assembly 31 of the print engine, or finishing material located near the print head or print assembly 31 of the print engine or located in the output section 5 (not shown).

The paper path comprises a plurality of paper path sections 32, 33, 34, 35 for transporting the image receiving material from an entry point 36 of the print engine and control section 3 along the print head or print assembly 31 to the inlet 53 of the output section 5. The paper path sections 32, 33, 34, 35 form a loop according to the present invention. The loop enables the printing of a duplex print job and/or a mix-plex job, i.e. a print job comprising a mix of sheets intended to be printed partially in a simplex mode and partially in a duplex mode.

The print head or print assembly 31 is suitable for ejecting and/or fixing marking material to image receiving material. The print head or print assembly 31 is positioned near the paper path section 34. The print head or print assembly 31 may be an inkjet print head, a direct imaging toner assembly or an indirect imaging toner assembly.

While an image receiving material is transported along the paper path section 34 in a first pass in the loop, the image receiving material receives the marking material through the print head or print assembly 31. A next paper path section 32 is a flip unit 32 for selecting a different subsequent paper path for simplex or duplex printing of the image receiving material. The flip unit 32 may be also used to flip a sheet of image receiving material after printing in simplex mode before the sheet leaves the print engine and control section 3 via a curved section 38 of the flip unit 32 and via the inlet 53 to the output section 5. The curved section 38 of the flip unit 32 may not be present and the turning of a simplex page has to be done via another paper path section 35.

In case of duplex printing on a sheet or when the curved section 38 is not present, the sheet is transported along the loop via paper path section 35A in order to turn the sheet for enabling printing on the other side of the sheet. The sheet is transported along the paper path section 35 until it reaches a merging point 34A at which sheets entering the paper path section 34 from the entry point 36 interweave with the sheets coming from the paper path section 35. The sheets entering the paper path section 34 from the entry point 36 are starting their first pass along the print head or print assembly 31 in the loop. The sheets coming from the paper path section 35 are starting their second pass along the print head or print assembly 31 in the loop. When a sheet has passed the print head or print assembly 31 for the second time in the second pass, the sheet is transported to the inlet 53 of the output section 5.

The input section 4 may comprise at least one input holder 44, 45, 46 for holding the image receiving material before transporting the sheets of image receiving material to the print engine and control section 3. Sheets of image receiving material are separated from the input holders 44, 45, 46 and guided from the input holders 44, 45, 46 by guiding means 42, 43, 47 to an outlet 36 for entrance in the print engine and control section 3. Each input holder 44, 45, 46 may be used for holding a different kind of image receiving material, i.e. sheets having different media properties. While 3 input holders are illustrated in FIG. 1, the number of input holders may include one, two, three or more input holders.

The local user interface 7 is suitable for displaying user interface windows for controlling the print job queue residing in the controller 37. In another embodiment a computer N1 in the network N has a user interface for displaying and controlling the print job queue of the printer 1.

Figure 2:
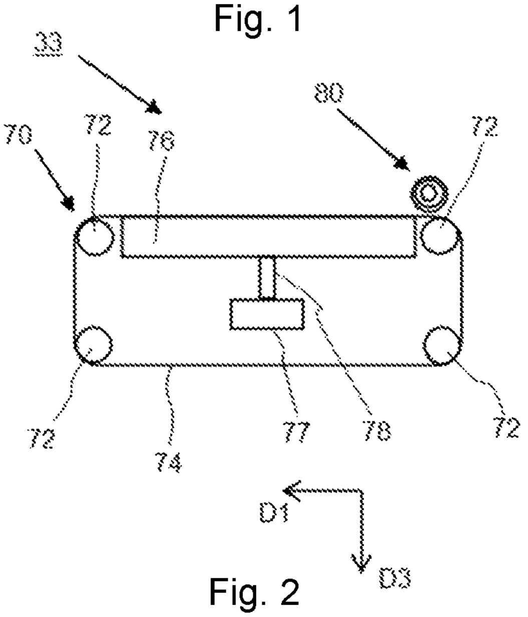
FIG. 2 is a schematic cross-sectional side view of the sheet conveyor of the sheet printer in FIG. 1.

FIG. 2 shows a schematic cross-sectional view of a conveyor 70 positioned at the paper path section 33. The conveyor 70 comprises a plurality of rollers 72 which support and drive an endless conveyor belt 74. At least of the rollers 72 is provided with a drive or motor for driving the belt 74. The belt 74 is permeable to gas, specifically to air, to apply an underpressure to a sheet of an image receiving member positioned on the belt 74. The sheet is thereby held in position against the belt 74. The holding force applied by the underpressure should be sufficient to prevent displacement of the sheet with respect to the belt 74. Generally, the belt 74 is or has been aligned with respect to the print head assembly 31. The belt 74 is provided with a matrix of through-holes to draw in air through the belt 74. The belt 74 is positioned above a suction chamber 76 which is connected to a suction source 77, such as a pump or fan, via line 78. It will appreciated that the suction source 77 may be positioned remote from the suction chamber 76 by extending the line 78. To achieve good image quality the sheet should be flatly positioned below the print head assembly 31. This prevents any irregularities in the sheet from resulting in print artifacts. It further allows for a narrow print gap between the print head assembly 31 and the sheet, which allows for more accurate ink droplet positioning. To maintain the sheet in a planar state, a pressing means 80 is provided at the upstream side of the belt 74.

Figure 3:
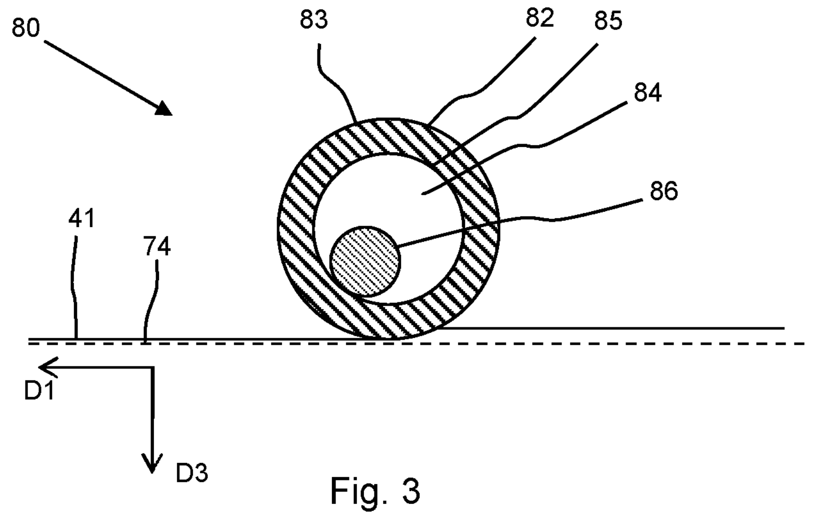
FIG. 3 is a schematic cross-sectional side view a first embodiment of the sheet conveyor in FIG. 2.
Figure 4:
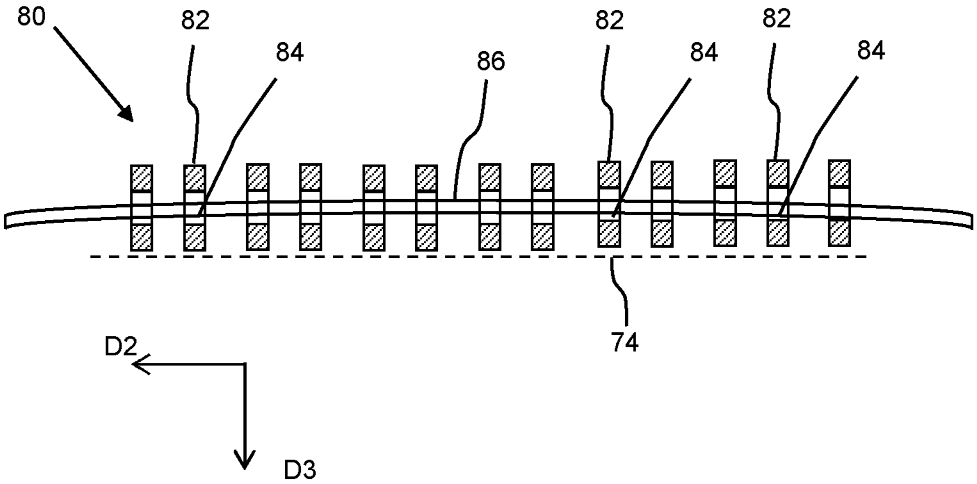
FIG. 4 is a schematic cross-sectional front view of the first embodiment of the sheet conveyor in FIG. 2.

FIG. 3 and FIG. 4 illustrate in detail the pressing means 80. The pressing means 80 comprise a first body 82 provided with an opening 84. The first body 82 in FIG. 3 is formed as a wheel in the form of a hollow cylinder having a central opening 84. The first body 82 is provided moveably around a second body 86, which extends in the lateral direction D2 through the opening 84 of the first body 82. The second body 86 is formed as a longitudinal support rod which extends through the openings 84 of the plurality of first bodies 82. The first bodies 82 comprise a round or circular circumference 83 when viewed in the lateral direction D2. The first bodies 82 with their circular circumference 83 are provided moveably, specifically rotatably, around the second body 86. This allows the first bodies 82 to rotate as the sheet 41 is moved beneath the first bodies 82. This allows for a low friction contact between the pressing means 80 and the sheet 41, which prevents displacement of the sheet 41 with respect to belt 74 and/or with respect to the print head assembly 31. Note that the rotational motion of the first body 82 may be irregular due to the relatively large amount of play between the bodies 82, 86.

The first body 82 is suspended with play on the second body 86. The opening 84 of the first body 82 is larger than a cross-section of the second body 86, which allows the first body 82 to move with respect to the second body 86. The first bodies 82 are not rigidly connected to one another, such that the first bodies 82 are moveable independent of one another with respect to the second body 86. The opening 84 of each first body 82 is positioned and dimensioned, such that the top edge of the circumference 85 of the opening 84 is at all times at a greater distance from the belt 74 in the perpendicular direction D3 than a top surface or edge of the second body 86. The first body 82 is allowed to move in the perpendicular direction D3 towards the belt 74, but when the lower portion of the first body 82 contacts the belt 74, the top edge of the circumference 85 of the opening 84 will still be above the second body 86. This allows the first body 82 to press onto the sheet 41 under the influence of gravity. The weight of the first body 82 is preferably appropriately chosen to maintain sufficient contact between the sheet 41 and the first body 82 during use. The first body 82 is preferably sufficiently heavy to prevent the first body 82 from bouncing off the sheet 41 under operational conditions.

The first body 82 is further sufficiently light-weight to prevent the pressing means 80 from substantially deforming the sheet 41 in such a manner that said deformation remains visible in the printed sheet 41.

The height dimension of the opening 84 in the perpendicular direction D3 is larger than the cross-sectional height of the second body 86 in said direction. The opening 84 is further larger than the cross-section of the section of the second body 86 in the transport direction D1. This play between the first and second bodies 82, 86 allows the first body 82 to rotate or pivot around an axis in the perpendicular direction D3, as well as rotate around an axis in the lateral direction D2. The rotational range of the first body 82 is limited by the relative size of the opening 84, but the limited rotational range is sufficient to allow the first body 82 to align itself to any in-plane forces in the sheet 41. This prevents damage to the sheet 41 during pressing.

The support rod forming the second body 86 is provided with a drive for driving the support rod into rotation. This further reduces friction between the sheet 41 and the first body 82. A driven support rod is further advantageous in case of thick sheets, such as cardboard, which may lift the bottom side of the first body into contact with the bottom side of the support rod forming the second body 86. This prevents such thicker sheets from becoming stuck.

As shown in FIG. 4, multiple first bodies 82 are provided together on the second body 86. The first bodies 82 are spaced apart from one another in the lateral direction D2. At least ten first bodies 82 are shown in FIG. 4, which are spaced apart at regular intervals. The distance between first bodies 82 may also vary dependent on the design and application of the conveyor 70. Spacing members may be provided in between first bodies 82 to maintain the first bodies 82 spaced apart in the lateral direction D2 while allowing for their moveability.

Figure 5:
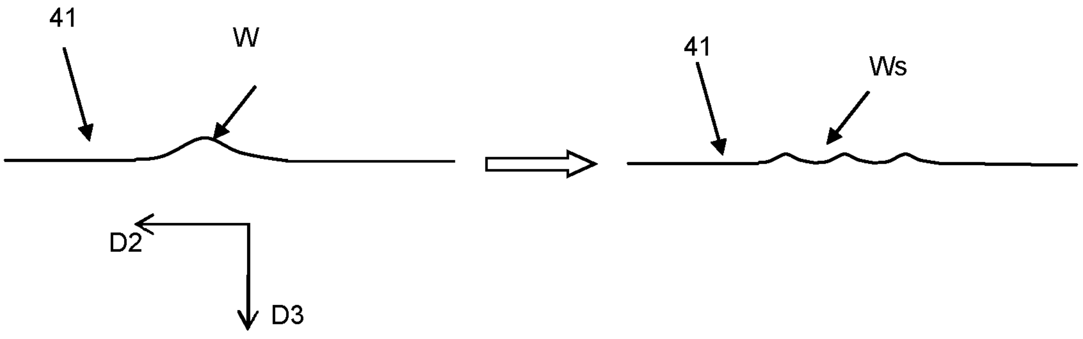
FIG. 5 is a schematic cross-sectional front view of the effect of the first embodiment of the sheet conveyor in FIG. 2 on a sheet.

FIG. 5 schematically illustrates the effect of the pressing means 80 on the sheet 41. On the left hand side a cross-section of the sheet 41 upstream of the pressing means 80. The sheet 41 has landed on the belt 74 with a large wrinkle W, where the sheet 41 locally curves away from the belt 74. The right hand side of the FIG. 5 shows said section of the sheet 41 after passing below the pressing means 80. Multiple first bodies 82 press down onto the sheet 41 locally flattening sections of the large wrinkle W. In consequence the large wrinkle is transformed by the pressing means into multiple smaller wrinkles Ws, each having a maximum height less than that of the original wrinkle W. This results in an overall flatter sheet 41 and allows for a small print gap between the print head assembly 31 and the belt 74.

Figure 6:
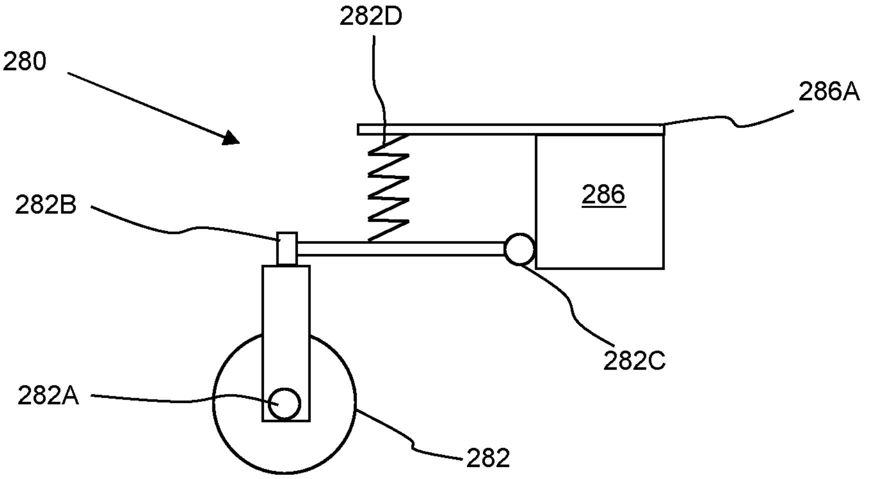
FIG. 6 is a schematic side view a third embodiment of the sheet conveyor in FIG. 2.
Figure 7:
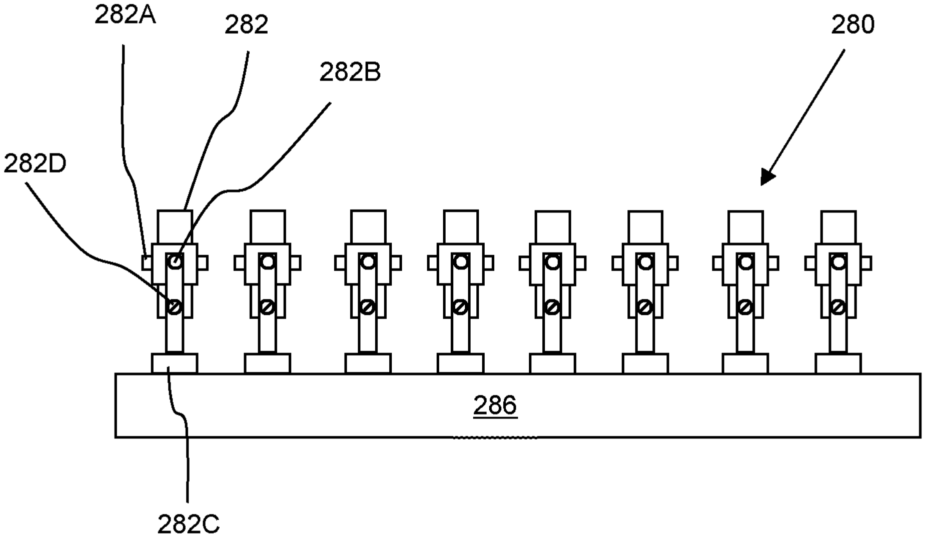
FIG. 7 is a schematic top view of the third embodiment of the pressing means in FIG. 8.

FIGS. 6 and 7 illustrate a third embodiment, wherein the pressing means 280 are formed of a plurality of the pressing members, each comprising a wheel 282 or cylinder, which is rotatable around an axis 282A parallel to the sheet support plane. The wheel 282 and its axis 282A around mounted moveably in the perpendicular direction D3 on the support rod 286 via a bearing 282C or hinge. The wheel 282 is further able to rotate around an axis in the perpendicular direction D3 by means of rotational bearing 282B. The wheel 282 presses onto the sheet under the influence of gravity, but the pressing force may be increased by urging elements 282D which individually press onto the support for each wheel 282. The urging elements 282D, which in FIG. 7 are formed as springs, are preferably connected to the frame of the printer, for example via the support plate 286A and/or the support rod 286. The urging elements 282D provide an additional downward force on the wheel 282 alongside the gravitational force of the wheel 282. The urging force may be configured to constantly press onto the sheet 41 as an additional pressing force on the sheet 41 or to act when the wheel 282 is lifted a predetermined distance from the sheet support surface to prevent the wheel 282 from releasing the sheet 41, similar to a damper.

Although specific embodiments of the invention are illustrated and described herein, it will be appreciated by those of ordinary skill in the art that a variety of alternate and/or equivalent implementations exist. It should be appreciated that the exemplary embodiment or exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

It will also be appreciated that in this document the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A sheet printer comprising a first sheet conveyor, comprising an endless, air permeable belt, a print head assembly positioned over the belt, the belt defining a sheet support surface positioned downstream of a second sheet conveyor and pressing means positioned upstream of the print head assembly, the pressing means being configured to press a sheet transferred from the second sheet conveyor onto the sheet support surface of the first sheet conveyor, wherein the pressing means comprise a plurality of pressing members spaced apart from one another in a lateral direction of the belt, each pressing member comprising a first body formed as a wheel with a central opening and moveable in a perpendicular direction with respect to the belt as well rotatable or pivotable around an axis in the perpendicular direction independent of the corresponding first bodies of other pressing members, wherein each pressing member comprises a second body formed as a portion of a support rod extending in the lateral direction through said opening, wherein a cross-section of the central opening exceeds a cross-section of the support rod, such that the wheel is moveable with respect to the support rod in the perpendicular direction as well as rotatable or pivotable over a predetermined range around an axis in the perpendicular direction, but limits movement of the first and second bodies with respect to one another in one or more directions parallel to the support surface, wherein the central opening further allows one of the first and second bodies to press onto the sheet under an influence of gravity, when the perpendicular direction is parallel to the direction of gravity, wherein the first body is moveable towards the second body in the perpendicular direction into an end position where a circumference of the opening prevents further movement of the first body in said direction, and wherein the belt is positioned with respect to the second body in such a manner that during use the first body is prevented from reaching the end position.

2. The sheet printer according to claim 1, wherein each first body is further rotatable around an axis parallel to the lateral direction.

3. The sheet printer according to claim 1, wherein the central opening limits the relative movement of the first and second bodies to maintain the first and second bodies at a similar lateral and/or longitudinal position in a transport direction of the belt, while allowing said bodies to move with respect to one another in the perpendicular direction for pressing onto the sheet under the influence of gravity as well as to rotate and/or pivot with respect to one another around axis in the perpendicular direction as a result of a force originating from the sheet and being parallel to the sheet support plane.

4. The sheet printer according to claim 3, wherein the first bodies are movable with respect to the sheet support surface independent of one another and the second body is stationary with respect to the sheet support surface.

5. The sheet printer according to claim 1, wherein the first body comprises a circular circumference when viewed in the lateral direction.

6. The sheet printer according to claim 5, wherein the central opening is circular body, such that the first body is formed as a wheel with constant thickness.

7. The sheet printer according to claim 6, wherein a distance between the belt and the second body is less than a diameter of the wheel of the first body minus its thickness.

8. The sheet printer according to claim 1, wherein a weight of the first body is sufficiently large to maintain a portion of the sheet below the first body in contact with the belt.

9. The sheet printer according to claim 1, wherein a circumference of the opening during use surrounds the other of the first and second bodies on at least two sides of the other of the first and second bodies.

10. The sheet printer according to claim 1, wherein at least five, preferably at least eight pressing members, and very preferably at least ten pressing members are spaced apart from one another in a lateral direction of the belt.

11. The sheet printer according to claim 10, further comprising a drive for rotating the support rod.

12. The sheet printer according to claim 1, wherein a difference between a diameter of the opening and a diameter of the second body is less than a distance between the opening and the sheet support surface in the perpendicular direction.

13. A first sheet conveyor for a sheet printer comprising an endless, air permeable belt defining a sheet support surface positioned downstream of a second sheet conveyor and pressing means for pressing a sheet transferred from the second sheet conveyor onto the sheet support surface of the first sheet conveyor, wherein the pressing means comprise a plurality of pressing members spaced apart from one another in a lateral direction of the belt, each pressing member comprising a first body formed as a wheel with a central opening and moveable in a perpendicular direction with respect to the belt as well as rotatable or pivotable around an axis in the perpendicular direction independent of the corresponding first bodies of other pressing members, wherein each pressing member comprises a second body moveable with respect to one another, wherein each second body is formed as a portion of a support rod extending in the lateral direction through said opening, wherein a cross-section of the opening exceeds a cross-section of the support rod, such that the wheel is moveable with respect to the support rod in the perpendicular direction as well as rotatable or pivotable over a predetermined range around an axis in the perpendicular direction, and such that the opening limits movement of the first and second bodies with respect to one another in one or more directions parallel to the support surface and allows one of the first and second bodies to press onto the sheet under an influence of gravity, when the perpendicular direction is parallel to a direction of gravity, wherein the first body is moveable towards the second body in the perpendicular direction into an end position where a circumference of the opening prevents further movement of the first body in said direction, and wherein the belt is positioned with respect to the second body in such a manner that during use the first body is prevented from reaching the end position.

14. A method of transporting sheets in a sheet printer according to claim 13, the method comprising the steps of:

transferring a sheet onto the first sheet conveyor comprising the endless, air permeable belt defining the sheet support surface positioned from the second sheet conveyor; and pressing the transferred sheet by means of the pressing means for pressing the sheet onto the sheet support surface of the first sheet conveyor.

* * * * *